United States Patent
Harrigle et al.

(10) Patent No.: US 10,870,248 B2
(45) Date of Patent: Dec. 22, 2020

(54) NON-SYMMETRICAL TREAD RING PARTING LINE MOLD

(71) Applicant: Bridgestone Americas Tire Operations, LLC, Nashville, TN (US)

(72) Inventors: Dale R. Harrigle, Uniontown, OH (US); Michael J. Kubiak, New Franklin, OH (US); Neal G. Sehm, Akron, OH (US); Chad J. Saylor, North Canton, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 0 days.

(21) Appl. No.: 16/359,260

(22) Filed: Mar. 20, 2019

(65) Prior Publication Data
US 2019/0291369 A1 Sep. 26, 2019

Related U.S. Application Data

(60) Provisional application No. 62/646,938, filed on Mar. 23, 2018.

(51) Int. Cl.
| | | |
|---|---|---|
| *B29D 30/06* | (2006.01) | |
| *B60C 3/06* | (2006.01) | |
| *B29D 30/72* | (2006.01) | |
| *B29C 33/00* | (2006.01) | |

(52) U.S. Cl.
CPC ......... *B29D 30/0629* (2013.01); *B29D 30/72* (2013.01); *B60C 3/06* (2013.01); *B29C 33/005* (2013.01); *B29D 2030/0612* (2013.01)

(58) Field of Classification Search
CPC ............... B29D 30/0629; B29D 30/72; B29D 2030/0612; B29D 2030/063; B60C 11/0304; B60C 13/02; B29C 33/005
USPC .............................................. 152/209.8, 523
See application file for complete search history.

(56) References Cited

U.S. PATENT DOCUMENTS

| | | | | |
|---|---|---|---|---|
| 3,741,696 A | * | 6/1973 | Greenwood ....... | B29D 30/0629 425/47 |
| 3,778,203 A | * | 12/1973 | MacMillan ........ | B29D 30/0606 425/20 |
| 3,787,155 A | * | 1/1974 | Zangl ................. | B29D 30/0629 425/47 |
| 4,553,918 A | * | 11/1985 | Yoda ................. | B29D 30/0606 425/46 |

(Continued)

FOREIGN PATENT DOCUMENTS

| | | |
|---|---|---|
| CN | 2728742 Y | 9/2005 |
| EP | 671288 * | 1/1995 |

(Continued)

*Primary Examiner* — James P Mackey
(74) *Attorney, Agent, or Firm* — Shaun J. Fox; J. Gregory Chrisman

(57) ABSTRACT

A mold design having a non-symmetric tread ring parting line is described that forms a tread pattern that extends onto the off-shoulder area of a tire on one side. The mold has a single tread segment that forms the entire tread pattern on the tire. The tread segment of the mold is non-symmetric in that one end, a first end, extends farther downward than the opposite end, a second end. The first end of the tread segment contains a tread pattern design capable of imparting a tread design on the off-shoulder or sidewall of one side of the tire to form a non-symmetric tread pattern.

11 Claims, 3 Drawing Sheets

(56) References Cited

U.S. PATENT DOCUMENTS

| | | | |
|---|---|---|---|
| 6,290,810 B1 | 9/2001 | Yovichin et al. | |
| 6,318,985 B1 * | 11/2001 | Heindel | B29D 30/0629 |
| | | | 425/46 |
| 6,955,782 B1 * | 10/2005 | Ratliff, Jr. | B29D 30/0629 |
| | | | 264/326 |
| 7,726,368 B2 * | 6/2010 | Sakai | B29D 30/0606 |
| | | | 152/209.15 |
| 2003/0116246 A1 * | 6/2003 | Kuroda | B60C 3/06 |
| | | | 152/209.9 |
| 2004/0018262 A1 * | 1/2004 | Reep | B29D 30/0629 |
| | | | 425/35 |
| 2005/0269004 A1 * | 12/2005 | Miyabe | B60C 11/0304 |
| | | | 152/209.9 |
| 2010/0326579 A1 | 12/2010 | Watabe et al. | |
| 2011/0117229 A1 * | 5/2011 | Bachochin | B29D 30/0605 |
| | | | 425/38 |
| 2013/0328240 A1 * | 12/2013 | Takahashi | B29D 30/0601 |
| | | | 264/293 |
| 2016/0129653 A1 * | 5/2016 | Smith | B29D 30/0606 |
| | | | 425/47 |

FOREIGN PATENT DOCUMENTS

| | | | |
|---|---|---|---|
| FR | 2028383 | * | 10/1970 |
| JP | 2011-255685 | * | 12/2011 |
| JP | 2016097778 A | | 5/2016 |
| WO | 1998007562 A | | 2/1998 |

\* cited by examiner

NON-SYMMETRICAL TREAD RING PARTING LINE MOLD

TECHNICAL FIELD

The present disclosure relates to a non-symmetric tread tire mold and, in particular, to a tire mold having a non-symmetric tread ring parting line such that the tread pattern extends downward onto the off-shoulder area or sidewall on one side of a tire formed by the mold.

BACKGROUND

Tires are typically formed in molds assembled in a press machine. A tire in the green state is transferred into a mold for vulcanization. As placed in the mold, the green tire is placed over an inflatable bladder that is used to exert force on the green tire and press it against the inner surface of the mold to form patterns on the tire, for instance, on the sidewalls or tread region. There are various mold designs such as a two-piece mold used for the vulcanizing process. Other mold designs can include multiple mold segments that fit together and form a uniform circumferential tread on a tire.

Mold designs have segments or pieces that are typically symmetrical to ensure that the molded tire has a uniform design on both sides opposite the radial center of the tire. Thus, the portions of the mold segment or segments for forming the tread pattern span equal distance on both sides from the radial center in a symmetrical tread tire. The locations where mold segments meet together create parting lines on the tire, for example, between the sidewall and tread region or along the radial center of the tread pattern in a two-piece mold. In certain applications such as all-terrain or off-road tires, it can be desirable for the tread of the tire to extend lower onto the shoulder or sidewall portions. This extended tread portion can provide enhanced functionality, traction and an aggressive appearance to the tire. However, due to constraints on mold design for existing equipment and how a vulcanized tire exits a conventional press, limitations on mold segment designs and tread alternatives have been limited.

There is a need for new mold segments that can accommodate the formation of non-symmetric tires having tread patterns that extend to the shoulder or sidewall region on one side of the tire to enhance functionality and aesthetic appearance of off-road tires. It is an objective of the present disclosure to alleviate or overcome mold limitations of the prior art and provide mold designs that can be utilized in existing press assemblies. It has been found that modification of mold segments to adjust tread ring parting lines can be used to vulcanize tires having non-symmetric tread patterns, which leads to the ability of integrating more aggressive off-the-shoulder tread designs.

SUMMARY

In a first aspect, disclosed is a tire mold for forming a tire. The tire mold includes a plurality of tread mold segments, the tread mold segments each having an inner surface that contacts a tread portion of the tire for forming a non-symmetrical tread pattern on the tire; a pair of side molds, the side molds being in contact with the plurality of tread mold segments when the molds are closed and the side molds having an inner surface that contacts a sidewall portion of the tire; wherein when the plurality of tread mold segments and the pair of side molds are closed, a compartment in the tire mold is created for forming the tread portion, pattern thereon, and a pair of sidewalls of the tire.

In an example of aspect 1, the plurality of tread mold segments further contains a tread-forming inner surface for forming a non-symmetrical tread pattern on the tire.

In another example of aspect 1, the tread-forming inner surface of the inner surface of the plurality of tread mold segments contacts one sidewall portion of the tire for forming a tread pattern on the sidewall portion.

In another example of aspect 1, the tread-forming inner surface of the inner surface of the plurality of tread mold segments has a first tread endpoint and a second tread endpoint, the first tread endpoint extends to a first sidewall of the pair of sidewalls of the tire and the second tread endpoint terminates prior to contacting a second sidewall of the pair of sidewalls of the tire.

In another example of aspect 1, each of the plurality of tread mold segments has a first end face and a second end face for contacting the pair of side molds.

In another example of aspect 1, the first end face of each of the plurality of tread mold segments extends to a first level flush with a first side mold of the pair of side molds, the second end face of each of the plurality of tread mold segments extends to a second level flush with a second side mold of the pair of side molds, wherein the first level is displaced at a level different than the second level.

In another example of aspect 1, the first level extends further downward along a sidewall of the tire as compared to an opposite sidewall of the tire where the second level is positioned.

In a second aspect, there is a tire mold that includes a plurality of tread mold segments, the plurality of tread mold segments each has a first end face, a second end face, and an inner surface for forming a tread pattern on a tire; a pair of side molds having a first side mold and a second side mold, the pair of side molds further having sidewall inner surfaces for forming sidewalls on the tire; the first side mold has a first side mold end surface in contact with the first end face of the plurality of tread mold segments at a first level; the second side mold has a second side mold end surface in contact with the second end face of the plurality of tread mold segments at a second level; wherein the first level is offset and not parallel to the second level.

In an example of aspect 2, each of the plurality of tread mold segments includes a tread-forming inner surface having a non-symmetrical tread pattern positioned thereon.

In another example of aspect 2, the tread-forming inner surface adjacent the first end face of each of the plurality of tread mold segments contacts a sidewall portion of the tire when positioned in the tire mold.

In another example of aspect 2, the tread-forming inner surface is capable of forming a tread pattern on one sidewall of the tire.

In another example of aspect 2, the tread-forming inner surface has a first tread endpoint and a second tread endpoint, the first tread endpoint extends further downward along a sidewall portion of the tire as compared to the second tread endpoint arranged on an opposite sidewall of the tire.

In another example of aspect 2, the tread-forming surface extends along the inner surface and contacts an edge of the first end face of each of the plurality of the tread mold segments.

In another example of aspect 2, the first end face of each of the plurality of tread mold segments is not parallel with the second end face of each of the plurality of tread mold segments.

In a third aspect, there is a tread mold segment of a tire mold, the tread mold segment includes a first end face for contacting a first side mold, a second end face for contacting a second side mold, and an inner surface extending between the first end face and the second end face; the first end face of the tread mold segment being vertically displaced lower than the second end face of the tread mold segment; and the inner surface has a tread-forming surface for forming a non-symmetrical tread pattern on a tire, where the tread pattern is on one sidewall of the tire.

In an example of aspect 3, the first end face of the tread mold segment is displaced as compared to the second end face of the tread mold segment such that the first end face of the tread mold segment extends further down a sidewall of the tire than the second end face of the tread mold segment.

In another example of aspect 3, the tread-forming surface has a first tread endpoint and a second tread endpoint, the first tread endpoint is adjacent the first end face of the tread mold segment and the second tread endpoint being adjacent the second end face of the tread mold segment.

In another example of aspect 3, the tread-forming surface extends along the inner surface and contacts an edge of the first end face of the tread mold segment.

In another example of aspect 3, the tread mold segment is connected the first side mold and the second side mold, both the first side mold and the second side mold include an inner surface for contacting a sidewall portion of the tire.

In another example of aspect 3, the tread-forming surface of the tread mold segment includes a first side portion and a second side portion relative to the center line of the tread mold segment, the first side portion has a first tread pattern and the second side portion has a second tread pattern, wherein the first tread pattern of the first side portion is non-symmetrical to the second tread pattern of the second side portion.

In another example of aspect 3, a tire having a non-symmetrical tread portion and the non-symmetrical tread portion includes a tread pattern that extends onto one sidewall of the tire, wherein the tire is formed by the tread mold segment of aspect 3.

In an example of any of aspects 1, 2 or 3, a tire or portion thereof formed by the tire mold or tread mold segment has a non-symmetrical tread pattern, wherein the tire is installed on a vehicle such that the portion of the non-symmetrical tread pattern extending onto one sidewall of the tire faces outward from the vehicle. The tire installed on the vehicle further includes a sidewall facing inward towards the vehicle, wherein the non-symmetrical tread pattern does not extend onto the sidewall facing the vehicle.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably less than or not more than 25. In an example, such a range defines independently at least 5, and separately and independently, not more than 25.

The present disclosure relates to a tire mold having a plurality of tread mold segments for forming a non-symmetrical tread portion on a tire such that the tread portion includes a tread pattern that extends onto only one sidewall of the tire. The tread mold segments can form tread ring parting lines that are displaced on the tire, for example, a parting line on a sidewall on one side of a tire and a parting line along a shoulder region on the opposite side of the tire. The tread mold segments can have a first extended side for forming a tread pattern on the sidewall of a tire and a second non-extended side for terminating the tread pattern on the shoulder region of the tire on the opposite side. The tread mold segments can be used with pre-existing press machines such that the tread mold segments can be arranged on the tire exit side of a press, for instance, the top side of a press. The tread mold segments are arranged to fit with upper and lower side mold plates in a press for forming tire sidewalls.

Figure 1:
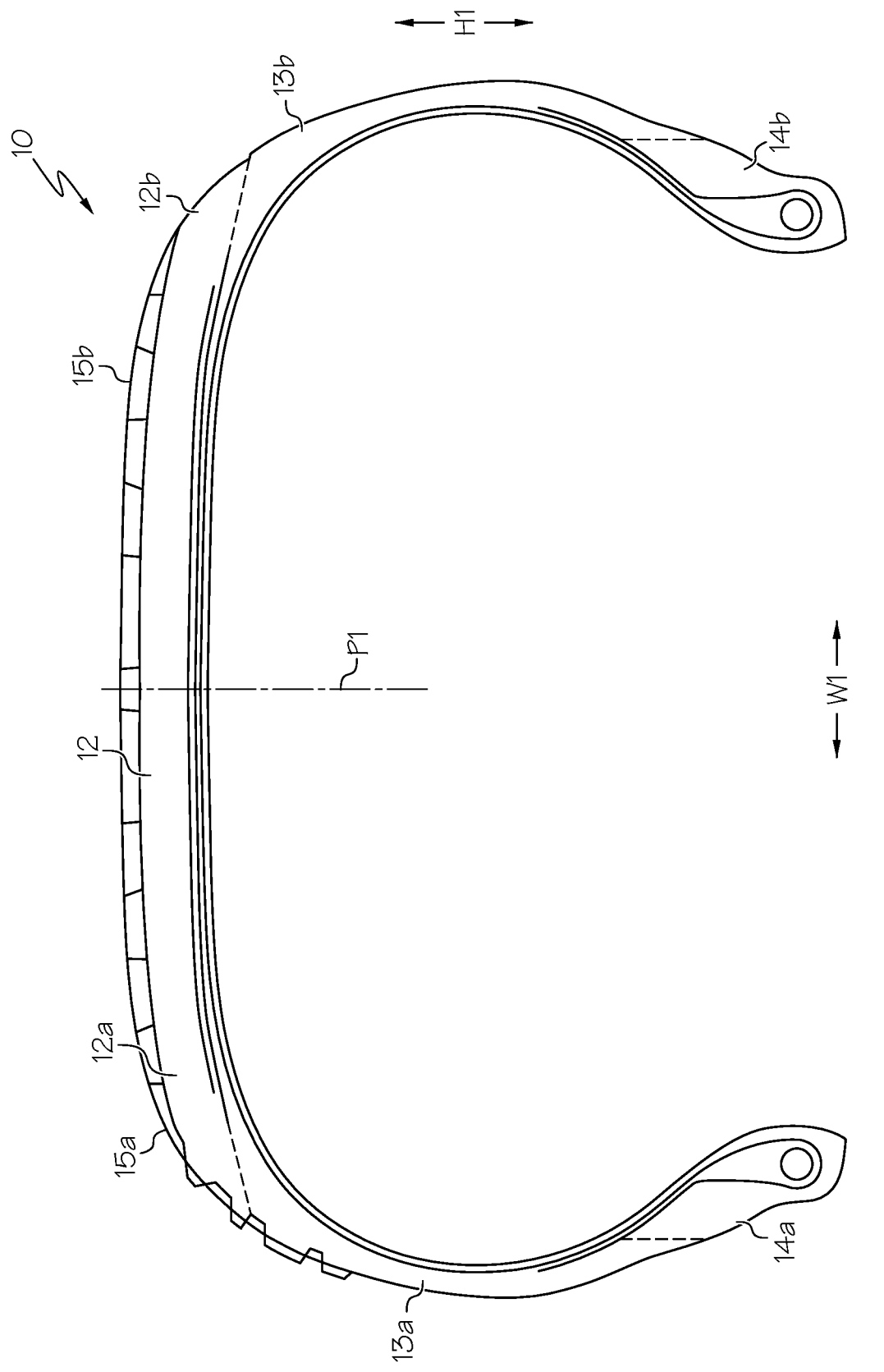
FIG. 1 shows a cross-section view of a tire having a non-symmetrical tread portion.
Figure 2:
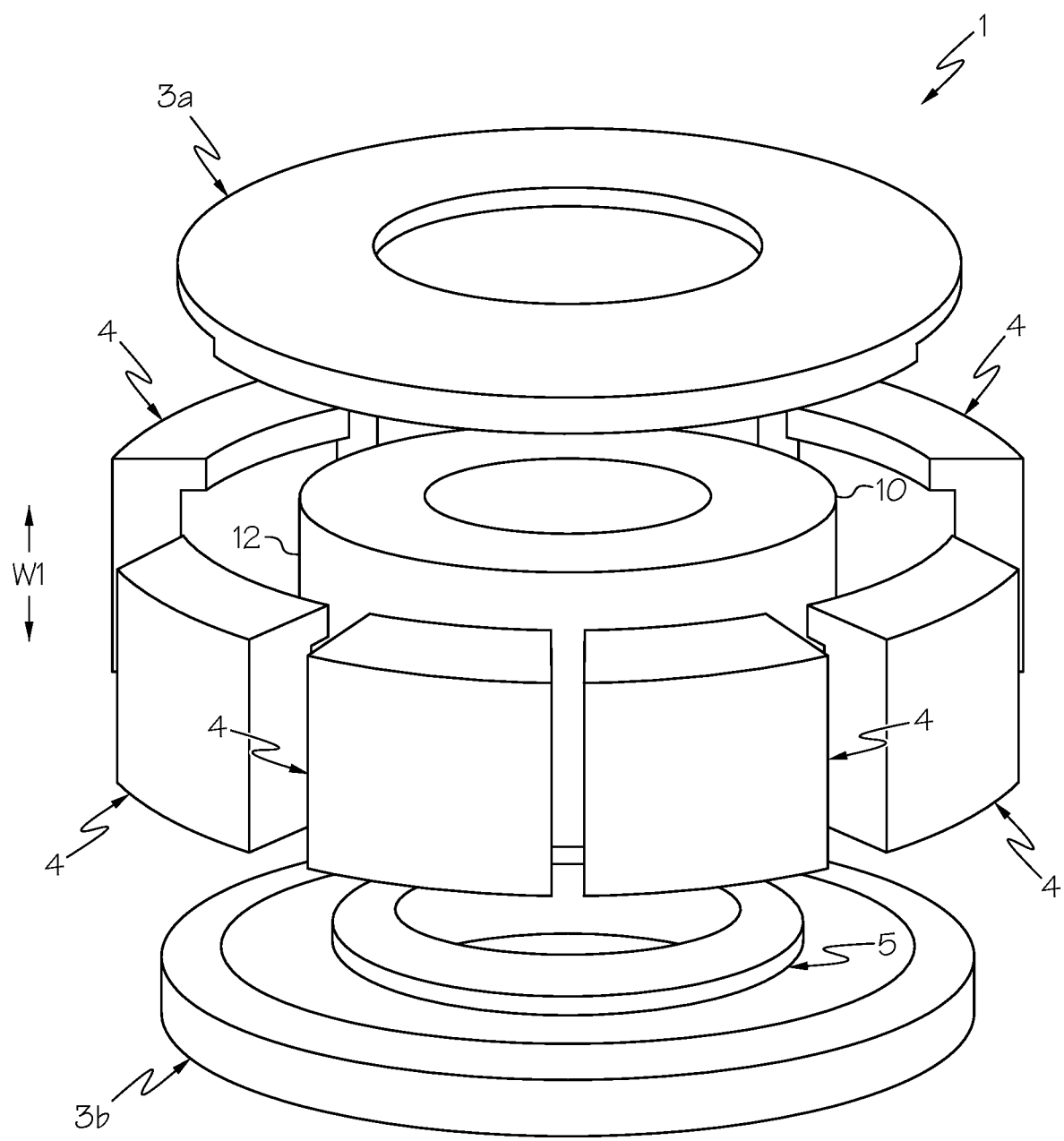
FIG. 2 shows a schematic diagram of a tire mold having the mold segments opened.
Figure 3:
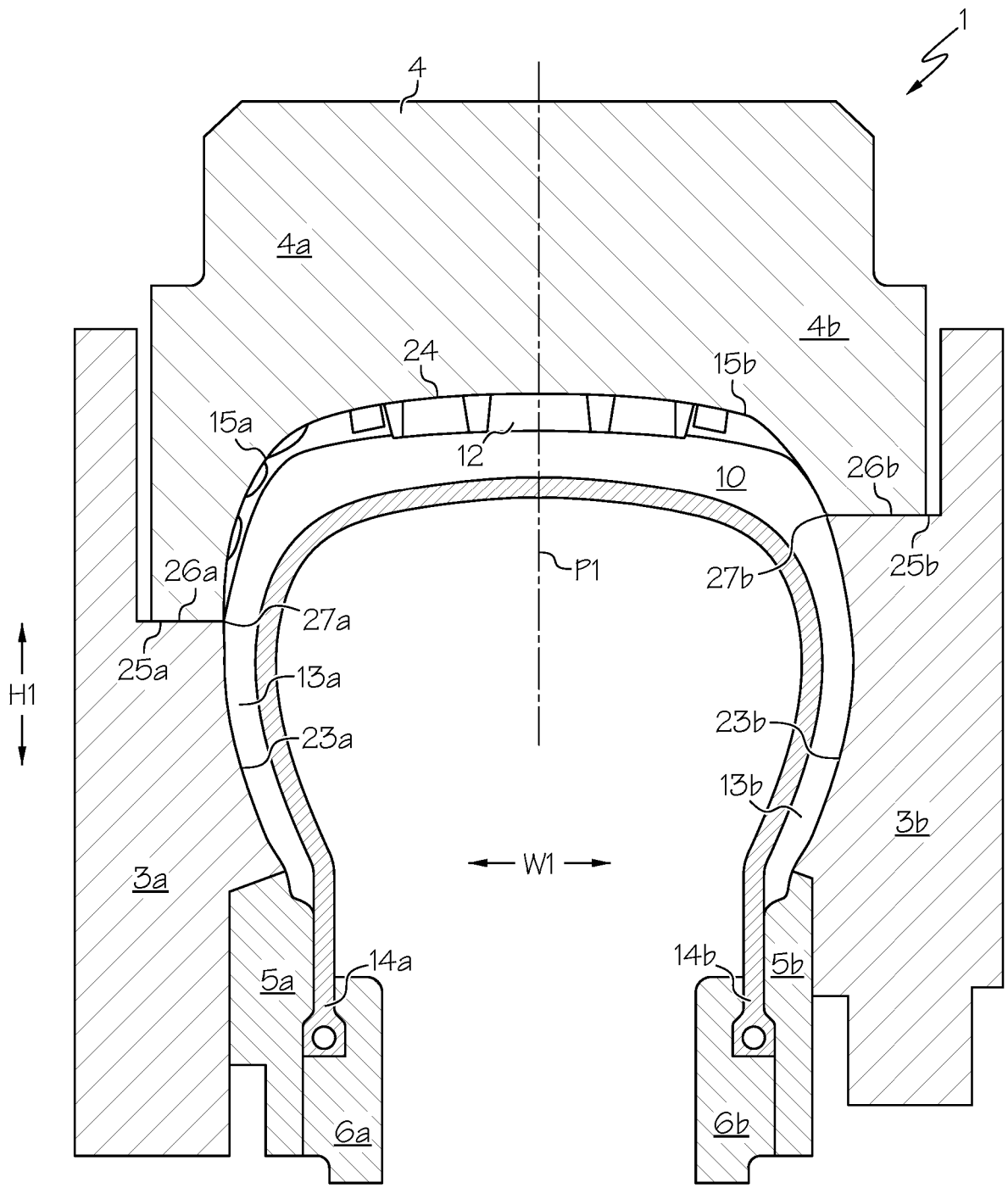
FIG. 3 shows a sectional view of a tire mold having the mold segments closed.

One embodiment of a tire mold for forming a tire is described herein with reference to FIGS. 1, 2 and 3. FIG. 1 shows a tire 10 (e.g., a pneumatic tire) formed by a tire mold. The tire 10 has a width referenced as W1 and a height referenced as H1. Not shown in FIG. 1 is the tire circumferential direction, which is the direction around the tire-rotation axis. The tire has an equatorial plane P1 that is a plane located at a center of the tire in the tire width-direction W1. Herein, P1 is used to indicate the cross-section center line of the tire or corresponding mold segment used to form the tread pattern.

The tire 10 has a pair of sidewalls 13, a first sidewall 13a and a second sidewall 13b, and bead portions 14, a first bead 14a and a second bead 14b. As shown, the pair of sidewalls begins at the dotted line near the bottom of the tread portion. As viewed from sidewall 13b, the tire has a shoulder area between the top of sidewall 13b and the beginning of the tread pattern 15b. The tread pattern of the tread portion 12 of the tire as shown is non-symmetrical in that the tread pattern covers a greater area of the outer surface of the tire on one side of the centerline as compared to the opposite side of the centerline. For example, the tread pattern, as viewed from the centerline of the tire, P1, in FIG. 1 has a greater cross-sectional outer surface length on one side of the centerline as compared to the other side.

The tread portion 12 of the tire can include a first tread portion 12a having a first tread pattern 15a and a second tread portion 12b having a second tread pattern 15b on either side of the centerline, P1. As shown, tread pattern 15a of tread portion 12a extends along the outer surface of the tire shoulder and onto the outer surface of the first sidewall 13a portion before terminating, whereas tread pattern 15b of tread portion 12b extends along the tire shoulder area and terminates before reaching the second sidewall 13b portion in the conventional manner. The tire 10, with a non-symmetrical tread pattern 15a, 15b, has tread pattern on a portion of only one sidewall whereas the opposite sidewall if free or void of any tread pattern.

The tread pattern as formed by the tread segment molds (e.g., as shown in FIG. 3) can extend onto the outer surface of one sidewall (e.g., 13a) at any desirable distance or area. As shown in FIG. 1, the tread pattern 15a extends onto about 30 percent of the outer surface of sidewall 13a. In another example, the tread pattern can extend onto 5, 10, 15, 20, 25, 30, 35, 40, 45 or 50 percent of the sidewall outer surface. In another example, the tread pattern can extend downward onto 5, 10, 15, 20, 25, 30, 35, 40, 45 or 50 percent of the height of the sidewall outer surface.

As shown in FIGS. 2 and 3, the tire mold 1 used for forming the non-symmetrical tread on tires can include a pair of side molds or plates 3a, 3b, each having respective inner surfaces 23a, 23b for coming into contact with and forming the sidewall portions 13a, 13b of tire 10. The mold 1 also includes a plurality of tread mold segments 4, for example 1 to 10 tread mold segments, which can be equally divided into the shape of a ring and in a circumferential direction of the tire. Each tread mold segment has an inner surface 24 for coming into contact with and forming the tread portion 12 and pattern 15a, 15b of tire 10. The tire mold 1 includes a pair of bead mold groups 5a, 6a, 5b, 6b into which the bead portions 14 are located and formed. In operation, the molds are brought together to form a closed position that forms a tire compartment of a tire-vulcanizing apparatus (e.g., press machine) that vulcanizes a green tire. After vulcanization is complete as known in the art, the molds can be moved in an open position in the conventional way to remove the tire from the machine.

The side molds 3a, 3b (e.g., upper and lower side molds) are separated from one another in the tire-width direction W1 as related to green tire 10 positioned in the compartment of the closed tire mold. The plurality of tread mold segments 4, preferably all of equal size and dimensions, are aligned in series along the outer surface of the tire tread portion circumference and arranged between the pair of side molds. As described in the present disclosure, the tire mold 1 is switched between a molds-open state as shown in FIG. 2 and a molds-closed state as partially shown in FIG. 3.

As shown in FIG. 3, a first side mold 3a has a first side mold end face 25a in direct contact with a first end face 26a of tread mold segment 4. In the closed position, the end faces of the side molds and tread segment molds are substantially perpendicular to sidewalls of the tire. The first side mold end face 25a can be a flat surface as shown and extend to and adjacent with the inner surface 23a of side mold 3a that contacts a sidewall of a tire. The intersection area of first side mold 3a inner surface 23a and end face 25a with the tread mold 4 inner surface 24 and end face 26a can form a tread ring parting line 27a on the outer surface of a tire. As such, the intersection area of the first side mold face 25a and the first end face 26a of the tread mold segment can be at a first level as viewed from the height direction of the tire 10 in the mold 1.

Parting lines, for example the tread ring parting line, can be a small protuberance on the surface of the tire 10. It is preferred that parting line be minimized and arranged on the outer surface of the tire at a location that reduces its visual detection by the human eye so the aesthetic appearance of the tire is enhanced and maintained. As shown, the parting line 27a between the tread mold segment 4a and the first side mold 3a is positioned on a first sidewall 13a of the tire below the shoulder area, wherein the tread pattern 15a formed by tread mold segment 4a extends along the shoulder area and onto an outer surface portion of the sidewall 13a. The tread pattern 15a, although not shown in the cross-section view, is molded on sidewall 13a along its entire outer radial surface.

A second side mold 3b has a second side mold end face 25b in direct contact with a second end face 26b of tread mold segment 4, wherein both end faces are perpendicular to sidewall 13b. The second side mold end face 25b can be a flat surface as shown and extend to and adjacent with the inner surface 23b of side mold 3b that contacts a sidewall 13b of the tire 10. The intersection area of second side mold 3b inner surface 23b and end face 25b with tread mold 4 inner surface 24 and end face 26b can form a tread ring parting line 27b on a tire. The intersection area of the second side mold face 25b and the second end face 26b of the tread mold segment can be a second level as viewed from the height direction of the tire 10 in the tire mold 1. As shown, the parting line 27b between the tread mold segment 4 and the second side mold 3b is positioned above and not on the second sidewall 13b of the tire, but rather on the shoulder area of the tire 10. As the tire mold 1 is configured with tread segment 4, the tread pattern is formed by tread mold segment 4 to extend along the shoulder area and terminate thereon before reaching the sidewall 13b.

Also as shown in FIG. 3, the first level where the first end face 26a of the tread mold segment 4 is flush with the first side mold face 25a is offset or displaced as compared to the second level where the second end face 26b of the tread mold segment 4 is flush with the second side mold face 25b of side mold 3b. That is, the first level is vertically displaced lower than the second level as viewed along the height direction H1 of a tire 10 as placed in tire mold 1.

As described herein, the tread mold segment 4 of the tire mold 1 forms a non-symmetrical tread pattern on the tread portion and one sidewall of a green tire such that a tread pattern is formed on a shoulder and sidewall portion on only one side of the tire. To achieve the non-symmetrical tread pattern, one end or leg of the mold segment 4, which forms end face 26a, extends further down along the sidewall on one side of the tire as compared to the opposite sidewall. When viewed in the tire height direction, H1, within the closed mold, the first and second levels, where the tread parting lines are formed, are not parallel with one another.

To form the non-symmetrical tread pattern on the tread portion of a green tire, the inner surface 24 of the tread mold segment 4 has a tread-forming inner surface for imparting the non-symmetrical tread pattern on the outer surface of the tire 10 positioned the tire mold 1. The non-symmetrical tread pattern is unique from a typical symmetrical tread pattern in that on one side of the tire, as viewed from the tire center, P1, the tread pattern extends further along the outer surface of only one side of a tire as compared to the opposite side, for instance, the shoulder and sidewall on one side as compared to the opposite side shoulder and sidewall of the tire. In another example, the tread-forming inner surface of tread segment mold 4 can form a tread pattern that extends onto and terminates on one sidewall of a tire whereas the tread pattern terminates (e.g., on the shoulder area) before reaching the opposite sidewall of the same tire.

As described above, the plurality of tread mold segments 4 are used to form the non-symmetrical tread pattern on a tire within the closed mold compartment of the press. The tread mold segments have an inner surface 24, wherein the inner surface 24 can be considered to have two portions, one on each side of the center line P1 of the tire 10, or center tire width W1. The inner surface halves each have a tread-forming inner surface responsible for imparting the tread pattern on the tire.

The tread-forming inner surfaces of the tread mold segment 4 can have a first tread endpoint and a second tread endpoint for defining the opposite ends of the tread pattern arranged on the tire. The first tread endpoint imparts the end of the tread pattern on one side of the tire (e.g., on a sidewall) and the second tread endpoint imparts the end of the tread pattern on the opposite side of the tire (e.g., on a shoulder). For example, the first tread endpoint can extend onto a portion of sidewall 13a and the second tread endpoint can end prior to extending onto a portion of sidewall 13b such as shown in FIG. 3. The first tread endpoint can terminate on inner surface 24 at or near the edge of the first end face 26a (e.g., at the parting line). The second tread endpoint can terminate on inner surface 24 at or near the edge of the second end face 26b. In one example, the first and second tread endpoints terminate at the respective end of the inner surface 24 of the tread mold segment 4.

In some embodiments, a tire 10, or a portion thereof, formed by the tire mold 1 or tread mold segment 4 has a non-symmetrical tread pattern 15a, 15b, for instance, as depicted in FIG. 1. The tire 10 can be installed or mounted on a vehicle (e.g., a passenger vehicle such as a truck or off-road vehicle) in the conventional manner (not shown). In one arrangement, as installed on a vehicle, the portion of the non-symmetrical tread pattern 15a extending onto only one sidewall 13a of the tire 10 can face outward from the vehicle. The tire 10, as installed on the vehicle, can further include an opposite sidewall 13b facing inward towards the vehicle, wherein the non-symmetrical tread pattern 15b does not extend onto the sidewall 13b facing the vehicle. Alternatively, the tire 10 can be mounted on a vehicle such that the portion of the non-symmetrical tread pattern 15a extending onto only one sidewall 13a of the tire 10 can face inward towards the vehicle, whereas the opposite sidewall 13b having the non-symmetrical tread pattern 15b not extending onto the sidewall 13b faces outward away from the vehicle.

The tire mold can be made of conventional materials such as metal. For example, the tread mold segments can be made from aluminum or aluminum alloys, which can be selected for being lightweight and ease of use in casting and manufacturing. Non-tread mold parts, e.g., side molds and bead molds, can be made of iron, which can be selected for its rigidity and lower thermal expansion as compared to the tread mold segments at higher temperatures, such as the vulcanization temperature.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A tire mold for forming a tire comprising:
a plurality of tread mold segments, the tread mold segments each comprising an inner surface that contacts a tread portion and a sidewall portion of a green tire, the inner surface of the plurality of tread mold segments comprises a tread-forming inner surface for forming a non-symmetrical tread pattern on the tire;
a pair of side molds, the side molds being in direct contact with the plurality of tread mold segments when the tire mold is closed, the side molds comprising an inner surface that contacts a sidewall portion of the tire;
wherein when the plurality of tread mold segments and the pair of side molds are closed, a compartment in the tire mold is created for forming the tread portion and a pair of sidewalls of the tire,
wherein the non-symmetrical tread pattern extends onto one of the pair of sidewalls of the tire and the tread-forming inner surface of the plurality of tread mold segments comprises a first endpoint of the non-symmetrical tread pattern and a second endpoint of the non-symmetrical tread pattern, the first endpoint of the non-symmetrical tread pattern extends to a first sidewall of the pair of sidewalls of the tire and the second endpoint of the non-symmetrical tread pattern terminates prior to contacting a second sidewall of the pair of sidewalls of the tire.

2. The tire mold of claim 1, wherein each of the plurality of tread mold segments comprises a first end face and a second end face for contacting the pair of side molds.

3. The tire mold of claim 2, wherein the first end face of each of the plurality of tread mold segments extends to a first level flush with a first side mold of the pair of side molds, the second end face of each of the plurality of tread mold segments extends to a second level flush with a second side mold of the pair of side molds, wherein the first level is displaced at a level different than the second level when the tire mold is closed.

4. The tire mold of claim 3, wherein the first level extends further downward along one of the pair of sidewalls of the tire as compared to an opposite sidewall of the pair of sidewalls.

5. A tire mold comprising:
a plurality of tread mold segments, the plurality of tread mold segments each comprising a first end face, a second end face, and an inner surface, the inner surface of the plurality of tread mold segments comprises a tread-forming inner surface for forming a non-symmetrical tread pattern on a tire, the non-symmetrical tread pattern extends onto one of a pair of sidewalls of the tire, and the tread-forming inner surface of the plurality of tread mold segments comprises a first endpoint of the non-symmetrical tread pattern and a second endpoint of the non-symmetrical tread pattern, the first endpoint of the non-symmetrical tread pattern extends to a first sidewall of the pair of sidewalls of the tire and the second endpoint of the non-symmetrical tread pattern terminates prior to contacting a second sidewall of the pair of sidewalls of the tire;
a pair of side molds comprising a first side mold and a second side mold, the pair of side molds each comprising a sidewall inner surface for forming one of the pair of sidewalls on the tire;
the first side mold comprising a first side mold end face in direct contact with the first end face of the plurality of tread mold segments at a first level;
the second side mold comprising a second side mold end face in direct contact with the second end face of the plurality of tread mold segments at a second level;
wherein the first level is offset to the second level.

6. The tire mold of claim 5, wherein the tread-forming inner surface adjacent the first end face of each of the plurality of tread mold segments contacts a sidewall portion of the tire when positioned in the tire mold.

7. The tire mold of claim 5, wherein the tread-forming surface extends along the inner surface and contacts an edge of the first end face of each of the plurality of the tread mold segments.

8. The tire mold of claim 5, wherein the first end face of each of the plurality of tread mold segments is offset and not parallel with the second end face of each of the plurality of tread mold segments.

9. A tread mold segment of a tire mold, the tread mold segment comprising:
  a first end face for contacting a first side mold, a second end face for contacting a second side mold, and an inner surface extending between the first end face and the second end face;
  the first end face of the tread mold segment being vertically displaced lower than the second end face of the tread mold segment in the radial direction; and
  the inner surface comprising a tread-forming surface for forming a non-symmetrical tread pattern on a tire, the tread-forming surface extends onto one of a pair of sidewall portions of the tire, and the tread-forming surface comprising a first endpoint of the non-symmetrical tread pattern and a second endpoint of the non-symmetrical tread pattern, the first endpoint of the non-symmetrical tread pattern being adjacent the first end face of the tread mold segment and the second endpoint of the non-symmetrical tread pattern being adjacent the second end face of the tread mold segment, and the first end face of the tread mold segment being displaced as compared to the second end face of the tread mold segment such that the first end face of the tread mold segment extends further down along one sidewall of the pair of sidewalls of the tire than the second end face of the tread mold segment.

10. The tread mold segment of claim 9, wherein the tread mold segment is connected to the first side mold and the second side mold, both the first side mold and the second side mold comprising an inner surface for contacting a sidewall portion of the tire.

11. The tread mold segment of claim 9, wherein the tread-forming surface of the tread mold segment comprises a first side portion and a second side portion relative to the center line of the tread mold segment, the first side portion comprising a first tread pattern and the second side portion comprising a second tread pattern, wherein the first tread pattern of the first side portion is non-symmetrical as compared to the second tread pattern of the second side portion.

* * * * *